United States Patent Office 3,263,320
Patented August 2, 1966

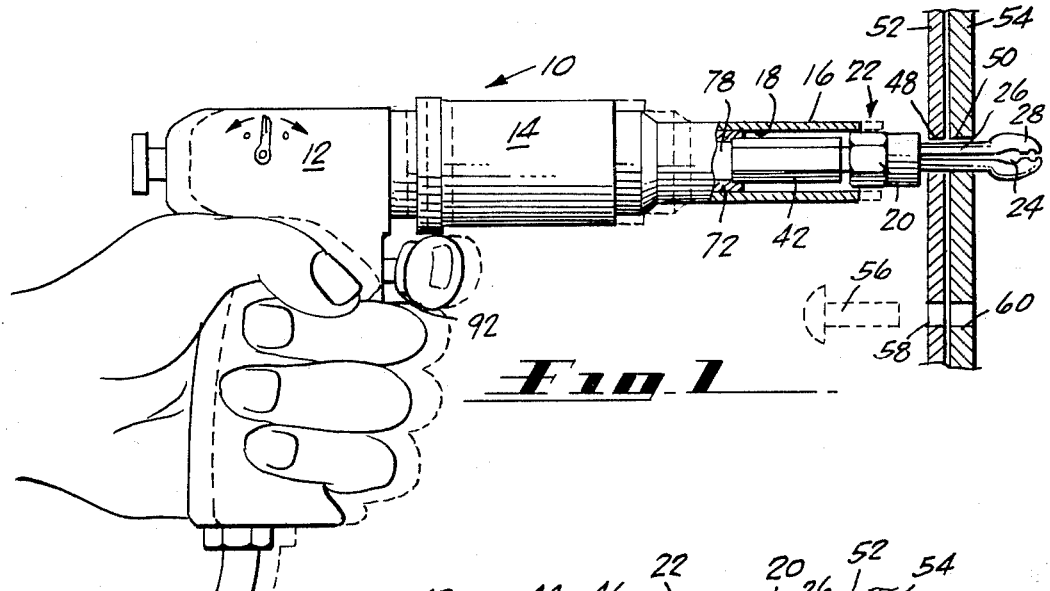
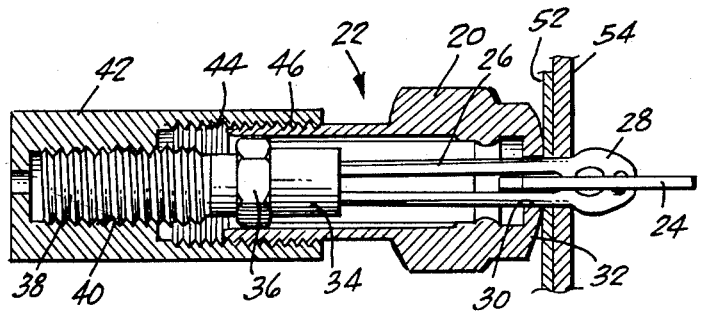
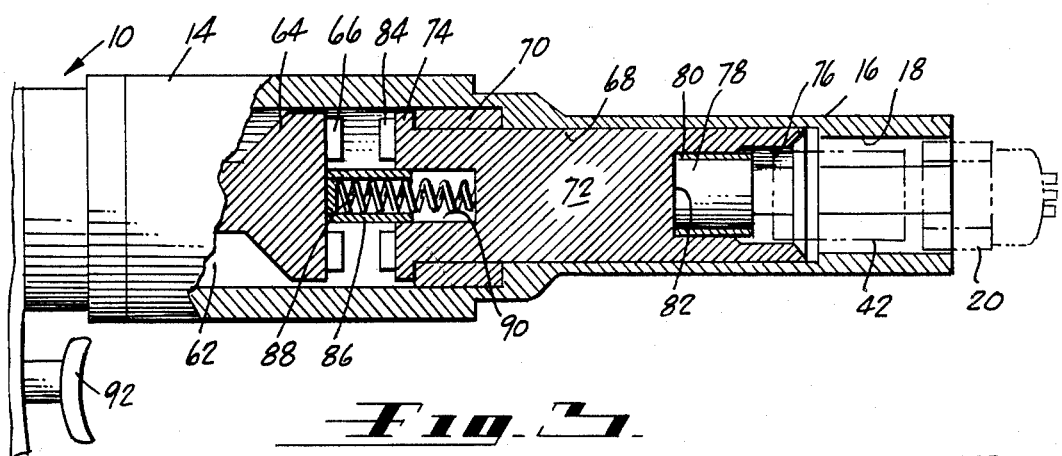

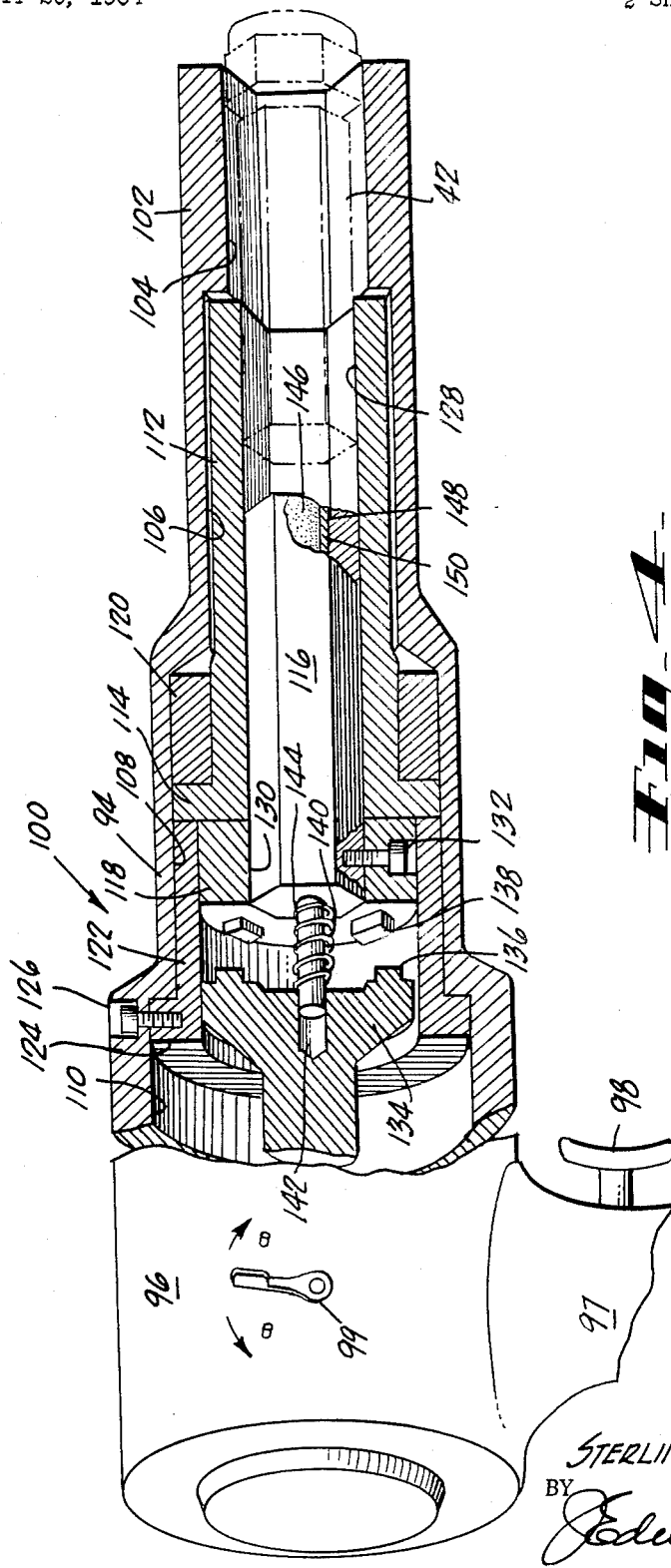

3,263,320
APPARATUS AND METHOD FOR ASSEMBLING AND DISASSEMBLING CLAMPS
Sterling B. Jones, Torrance, Calif., assignor to Monogram Industries, Inc., Culver City, Calif.
Filed Apr. 20, 1964, Ser. No. 361,178
16 Claims. (Cl. 29—423)

This invention lies in the field of speedrunners for use with axial, pin type clamps used in holding apertured workpieces in assembled relation. The disclosure is directed particularly to such a speedrunner which actuates clamps to bind and release the work without damaging the clamp bodies and which cooperates with them in a particular manner to serve as a handle for forcibly releasing them from workpieces in which they may be caught.

The general type of clamp with which this invention is concerned comprises a body or base portion having a blunt end adapted to serve as a clamping abutment. This blunt end has a passage through which a spreader bar projects in fixed position. On each side of the spreader bar a pin or needle is slidably mounted and these three elements may be axially inserted into aligned apertures in an assembly of workpieces. The free ends of the pins are headed and the inner ends are secured to a carrier which slides axially in the base portion to draw the pins rearwardly over the spreader bar to expand and bind apertured workpieces together, and to move the pins forwardly so that they will collapse and release the work. The rear portion of the carrier is threaded and engaged by a nut which reacts against the base portion to move the carrier. The nut, which may be considered the head portion of the clamp, may merely abut the aft end of the base portion or be threadedly connected to it. Both the base portion and the nut are provided with tool engaging formations which normally are hexagonal.

Clamps of this type were originally actuated with a pair of simple wrenches, one to hold the base portion against rotation and the other to rotate the head portion or nut. This operation was satisfactory but slow. Simple nutrunners were then used to rotate the nut, but a wrench was still needed to hold the base portion. This difficulty was overcome by an improved nutrunner which had a forward stationary socket to engage the base portion and a second socket just behind it to engage the head portion or nut. The second socket was rotatable and driven by an air motor.

Although this was a considerable improvement, it still had faults. The nut turns up very rapidly on the threaded portion of the carrier, and when the headed pins reach their clamping position progress stops very suddenly and the nut binds tightly on the threads. If the torque of the motor, usually an air motor, is high enough to break the nut loose for releasing the clamp then the same high torque will bind the nut that much tighter and it still cannot be released. It can be broken loose with a hand wrench and then backed off with the nutrunner. The other procedure is to turn the driving socket up to full speed and then jam it on the nut. While this system does break the nut loose, it is undesirable because the rapidly spinning socket chews off the hexagon formation on the nut rather rapidly. The socket itself deteriorates at a slower rate, but still must be replaced frequently.

These difficulties were largely overcome by the earlier form of my invention which incorporated a barrel having a restraining socket at its fore end for engaging and holding the base portion of the clamp against rotation. A driving element was mounted for rotation within the barrel and had a driving socket at its fore end. An air motor having a drive rotor was mounted at the aft end of the barrel and was adapted to rotate the driving element under appropriate circumstances. The driving element was mounted for axial as well as rotative movement and was yieldingly held forward in the barrel. When the nut or head portion of the clamp "bottomed" in the driving socket, with the clamp located in a workpiece assembly, axial pressure on the barrel would force the driving element rearwardly into driving engagement with the drive rotor.

It will be seen that with the arrangement described above it is possible to satisfactorily break loose and drive the nuts or head portions of the clamps without incurring damage to the nuts. The tool is applied to the clamp so that both portions are seated in their respective sockets. The motor is now turned on and run at full speed. With maximum momentum available, the barrel is pushed forwardly so that the driving element is pushed rearwardly into driving engagement with the drive rotor and the full momentum is suddenly applied to the driving element so that it breaks the nut loose with ease. Since the sockets are fully engaged before the drive is applied there is no relative spinning and chewing of either the nuts or the sockets. The clutching means is, of course, designed to take the impact loads.

While this apparatus can be operated repeatedly in a proper manner without damage, it is still possible for the careless or uninformed operator to damage the tool or clamp by improper manipulation. If the nut or head portion of the clamp is not properly aligned to slip into the socket, it will engage the end edge of the socket and push the entire driving element rearwardly into engagement with the revolving drive rotor. The result is that the socket will spin at high speed and, as before, will attack and chew up the tool engaging formations on the head portion of the clamps.

My new design eliminates this difficulty by making it impossible to engage the drive rotor unless the nut is properly seated in the drive socket. In its presently preferred form, the barrel remains substantially the same with a socket at the fore end to engage the base portion of the clamp. The driving element, having a socket at its fore end to engage the head portion of the clamp, is mounted in the barrel for rotation but is restrained against axial movement. The coupler, or drive rotor engaging means, is slidably connected to the driving element and rotates therewith, and is held in a forward, disengaged position by yieldable means, which may be a spring. The fore end of the coupler projects into the socket zone. When a clamp nut is properly seated in the socket and the drive rotor is rotating at top speed the operator pushes the tool forward and the nut pushes the coupler backward into driving engagement with the drive rotor. Since the socket is not axially movable and the coupler can be actuated only by contact with the nut when fully seated in the socket, it will be seen that this design is proof against carelessness and lack of knowledge.

Various other advantages and features of novelty will become apparent as the description proceeds in conjunction with the accompanying drawings, in which:

FIGURE 1 is a side elevational view, partly in section, of a speedrunner of the general type described herein;

FIGURE 2 is a sectional view of a clamp especially adapted to cooperate with the speedrunner of this invention;

FIGURE 3 is a side elevational view, partly in section, of a speedrunner embodying the early form of the invention; and FIGURE 4 is a perspective view, partly in section, of the presently preferred form of the invention.

The invention is embodied in a speedrunner of the type shown in FIGURE 1, in which the unit 10 includes a reversible, controllable torque motor 12 secured to the aft end of a barrel 14. The internal wall of the fore part 16 of the barrel is formed as a socket 18, usually of hexagon section, to engage the base portion 20 of clamp 22 and hold it against rotation.

As better seen in FIGURE 2, this clamp, which is the subject of my copending patent application, Serial No. 184,272, includes a conventional spreader bar 24 and needles or pins 26 having heads 28, all extending forwardly through aperture 30 in the blunt fore end 32 of the base portion. The spreader bar is anchored in the fore part of the clamp and the pins are secured by suitable means to carrier 34 which has a hexagonal section 36 slidably and non-rotatably mounted in the base. The threaded aft end 38 is engaged by threads 40 of nut 42. This nut can be a simple machine nut bearing against the rear wall of base 20 but is here shown as disclosed in my copending application.

Briefly, nut 42 is formed with the relatively small threaded bore 40 in its rear portion and with a relatively large threaded bore 44 in its forward portions. The threads are of opposite hand and engage corresponding threads 38 and 46 on the carrier and the base respectively. As fully explained in the copending application this differential thread arrangement provides very rapid axial movement of the pins and correspondingly rapid application and release of the clamp.

Another very important feature of the construction of this clamp is the positive actuation of the pins in both application and release. Referring to FIGURE 1, pins 26 are passed through aligned apertures 48 and 50 in workpieces 52 and 54, after which they are drawn back and spread apart by bar 24 to clamp the workpieces into a tight assembly. A rivet 56 can then be inserted and driven in aligned apertures 58 and 60. As is more apparent in FIGURE 2, the laterally expanded pins now bind tightly in the apertures in the work pieces and a very strong axial force is necessary to move them forward to a position where they can collapse again and be released from the binding fit.

With the simple machine nut of the prior art clamps there is no problem about securing the clamps in place. However, when the nuts are backed off, they simply move rearwardly away from bearing contact with the rear walls of the clamps, and the pins remain firmly wedged. Extraneous force must then be used to drive them out, often resulting in damage. In the present clamp, when nut 42 is backed off portion 38 it advances on portion 46 of the base and positively pushes carrier 34 and pins 26 forwardly until they collapse and the binding effect is eliminated. It will also be noted that the nut reaches a positive stop at each extremity of its travel and cannot become accidentally disconnected. This feature is of importance in connection with a special feature of the speedrunner to be detailed hereinafter.

Turning to FIGURE 3, it will be seen that the enlarged portion of the barrel 14 encloses a cylindrical chamber 62. In the rear portion of this chamber is located the driver rotor 64 which may be carried by or connected to drive motor 12 to be rotated thereby. The front face of the rotor carries one or more positive abutments 66 constituting a jaw clutch or dog clutch for positive driving engagement with a driven member.

The intermediate portion of barrel 14 is bored to provide cylindrical chamber 68 which is larger in diameter than socket 18 and smaller than chamber 62. A bearing 70 is mounted in chamber 62 at its junction with chamber 68. Driving element 72 fits loosely in chamber 68 and is carried in bearing 70 for rotation and axial sliding. Outwardly extending flange 74 abuts bearing 70 to limit the forward movement of member 72 so that it has the desired axial clearance from socket 18. Formed in the front wall of member 72 is a drive socket 76, usually of hexagon or 12-point section to engage the nut or head portion 42 of the clamp. When the clamp is set into the speedrunner so that portions 20 and 42 of the clamp are properly engaged by sockets 18 and 76 and the latter is rotated in either direction, the clamp will be secured in the workpieces or released.

In many instances the apertures such as 48 and 50 in FIGURE 1 are not readily accessible and are frequently below the level of the workman or the tool, so that some way of temporarily retaining the clamp in the tool would be of great utility. This is taken care of in the present instance by the use of a bar magnet 78, surrounded by a brass sleeve or the like 80 and mounted in a recess 82 formed in element 72. The front face of the magnet may be flush with the rear wall of the socket or may project a slight distance into it as shown. When the clamp is inserted in the tool it will be releasably but securely held by the magnet so that the entire tool serves as a handle to extend the clamp into difficult locations and insert it into workpieces.

The rear face of driving element 72 is provided with positive abutments 84 engageable with abutments 66 on rotor 64 on occasion to form a driving connection for securing or releasing a clamp. Cup 86 is secured coaxially on rotor 64 and maintains coil spring 88 in coaxial position between members 64 and 72. It also fits slidably and rotatably into recess 90 in member 72 to serve as a guide. Spring 88 is under compression at all times to constantly but yieldably urge element 72 forwardly so that abutments or dogs 66 and 84 will normally be disengaged.

In operation, the speedrunner is set up as indicated in FIGURE 1, with the clamp pins and spreader bar inserted in the work and with the base and head portions inserted in their respective sockets. The motor is now operated by trigger 92 to bring the motor 12 up to speed, with drive rotor 64 spinning freely. The trigger is maintained depressed and the tool is moved forwardly as indicated by dotted lines in FIGURE 1. The net effect is that socket 18 slides farther onto base 20, and head portion 42 presses rearwardly against magnet 78 or the bottom of socket 76 and moves the entire driving element 72 rearwardly against the bias of spring 88.

The tool is moved suddenly so that dogs 66 and 84 will fully engage and abruptly initiate rotation of element 72 and relative rotation of portions 42 and 20. Because of this feature the motor can produce a relatively low torque and still have the full momentum of the full speed motor and drive rotor to apply an impact to the driving element and break portions 42 and 20 loose from each other if the threads are jammed, as is the usual case.

It can be seen that the device as described will function perfectly and do no damage to the clamps or the workpieces or the tool so long as it is operated carefully in the intended manner. However, it has been found that uninformed or careless operators will often fail to insure that the clamp is fully seated before proceeding. In such case the portion 20 may be just barely within socket 18 but portion 42 will also be almost wholly within socket 18 with its aft end just at the entrance to socket 76 and possibly out of axial alignment. If the motor is now spun up and the tool pushed forwardly, the misaligned clamp will push against the socket 76 and cause element 72 to become engaged with the drive rotor. Element 72 and socket 76 will therefore spin rapidly and chew up the hexagon formation of portion 42.

In order to combat this difficulty in the past it has been necessary to harden the tool formations on at least the head portions of the clamps. This was quite expensive and constituted a substantial percentage of the total cost of the clamps. Because certain parts of the clamp must be soft for subsequent operations it has been necessary to first copper plate the whole body, then broach off the plate where hardening is desired, and then put the body through one of the standard hardening processes. The preferred form of my invention eliminates any possibility of chewing up the tool engaging formations and hence eliminates the need for the described costly procedure of hardening them.

As illustrated in FIGURE 4, the speedrunner 100 is generally similar in external appearance to the device of FIGURE 1 and has a barrel 94 carrying at its aft end a reversible, controllable torque motor 96 having a handle 97, trigger 98, and direction switch 99. The fore end 102 of barrel 94 is formed internally with a restraining socket 104 generally of hexagon shape to engage base portion 20 of the clamp and hold it against rotation. Successively larger chambers 106, 108, and 110 are formed in barrel 94 rearwardly of socket 104. The nutrunner in this embodiment includes the driving element shown in the form of a sleeve 112 with an outwardly extending flange 114 at its aft end, and means to establish driving engagement with a rotary power source, the means including a drive shaft 116 having a head 118 which may be integral but preferably is a separate element.

The outer surface of sleeve 112 is preferably cylindrical and fits loosely within chamber 106 for free rotation. The aft end of the sleeve is journaled for rotation in bearing 120 in chamber 108, and flange 114 abuts the bearing to restrict it against forward movement. A second bearing 122 is also mounted in chamber 108 and abuts the rear face of flange 114 to prevent rearward movement. Hence the driving element 112 is mounted for free rotation but is restrained against axial motion. Bearing 122 is provided with an outwardly extending flange 124 seated in chamber 110 and anchored against movement by screw 126.

The fore end of element 112 is formed internally as a socket 128 to receive the head portion 42 of the clamp. Drive shaft 116 is slidably but non-rotatably received in an axial passage in the driving element 112. Any type of suitable connection may be used but the form shown has been found to be very satisfactory. The passage in the element is a continuation of socket 128 which is normally hexagonal or 12-point, and shaft 116 has a corresponding cross sectional shape. The socket and the shaft passage may be of different sizes but they are preferably the same for ease and economy of manufacture. Head 118 has a polygonal passage 130 matching the shape of drive shaft 116 for transmission of driving torque and is secured to the drive shaft by screw 132. It is mounted for sliding and rotational movement in bearing 122.

As in the previously discussed embodiment, a drive rotor 134 is located at the aft end of barrel 94 and generally within chamber 110, and it is carried by or connected to air motor 96. The front face of the rotor carries one or more positive abutments or dogs 136. The confronting rear face of head or coupler 118 carries cooperating positive abutments or dogs 138, adapted on occasion to engage dogs 136 to be rotated thereby. Shaft 116 bears a coaxial rearwardly extending guide pin 140 which extends into recess 142 in rotor 134. A coil spring 144 surrounds pin 140 and extends between the rotor and the drive shaft, and is under compression at all times to urge them apart and maintain the dogs normally disengaged. A bar magnet 146 and sleeve 148 are mounted in recess 150 in the fore end of drive shaft 116 and are preferably flush therewith.

The construction just described provides a clamp actuating mechanism which cannot be inadvertently clutched into operation to damage clamp parts when they are not properly seated. Socket 128 is immovable axially and hence cannot affect the clutching. Portion 42 of the clamp must enter socket 128 in correct attitude and penetrate its full depth before it can reach drive shaft 116. By this time portion 20 of the clamp is properly and fully seated in socket 104. The motor is now run up to speed and the tool pushed forward. At this time portion 42 of the clamp pushes drive shaft 116 and its head 118 rearwardly. Dogs 136 and 138 engage, drive shaft 116 is rotated and in turn rotates element 112 and its socket 128, and the clamp is tightened or released.

As pointed out above, the particular clamp shown and described will be positively released as well as tightened by the use of the present speedrunner. The sudden, impact engagement utilizes the full momentum of the driving means to break the clamp loose if the threads are jammed. A friction clutch can be used and operated in the same way but the positive engagement of the dog clutch is preferable.

Another very useful and important feature of the speedrunner of this invention, particularly when used with the disclosed clamp, is that it can be used directly as a handle to pull the clamps out of the work after normal release if there is any unusual resistance to withdrawal. One typical example is the case where the clamp has been used to hold workpieces coated at least in part with a strong cement or sealing compound. The parts are left clamped for several hours while the material sets, and some of it deposits on the pins and in the pin apertures. Even when the pins are fully released by reverse rotation the compound binds them in the apertures and a very strong axial pull is necessary to release them.

Another example is the case where rather large workpieces, such as airplane or missile panels, are assembled in a jig and a plurality of pin clamps are used to maintain them in assembled relation while they are being permanently fastened together. If one workpiece shifts even slightly in the plane of the work, it creates a high shear across the pin apertures, and the aperture walls bind very tightly on the pins and resist their removal.

Considering FIGURE 4, when the speedrunner is operated in a direction to release the clamp, socket 128 is rotated counterclockwise with respect to socket 104 and clamp portion 42 is rotated clockwise with respect to clamp portion 20. At the end of the movement, rotation is stopped but the torque continues as long as the pressure air supply to the motor is continued. Consequently there is a high torquing force between each socket and its respective clamp portion and a resulting high frictional force. This frictional force resists axial movement as well as rotative movement, and the speedrunner can be used as a large and convenient handle for pulling the clamp out of the work. It has been found that a pull well in excess of one hundred pounds can be applied in this way, and it is adequate for removal of jammed clamps in all but the most unusual situations.

The construction of FIGURE 3 will grip the clamp and pull it in the same way. The principal difference is that if the clamp is pulled partially out of the speedrunner because of the high drag in the workpieces it tends to pull element 72 forwardly and cause the dog clutch to disengage. In the FIGURE 4 construction member 112 does not move axially and the frictional force will remain in effect until portion 42 of the clamp is pulled completely out of socket 128.

The invention described above and illustrated in the drawings overcomes the difficulties experienced with prior devices used for the same purpose and provides a device which will safely and satisfactorily install and remove pin type clamps and which at the same time does not require them to be protected by costly hardening processes.

It will be apparent to those skilled in the art that various changes and modifications may be made in the construction and operation of the device as disclosed without departing from the spirit of the invention, and it is intended that all such changes and modifications shall be embraced within the scope of the following claims.

I claim:
1. A speedrunner for actuating an axial, pin type clamp having a base portion and a relatively rotatable head portion with tool engaging formations on each portion, comprising; a barrel having a fore end and an aft end with a drive motor at said aft end; the inner wall of the fore end of the barrel being formed to non-rotatably engage the base portion of said clamp; a driving element mounted for rotation in an intermediate portion of said barrel and being restrained against axial movement; the fore end of said element being formed to non-rotatably engage the head portion of said clamp; a drive shaft slidably and non-rotatably mounted in the aft portion of said element, and having a fore end adapted to be axially engaged and moved by the head portion of said clamp and an aft end carrying a drive abutment; a drive rotor connected to said drive motor and having a drive abutment engageable with said first mentioned drive abutment upon rearward axial movement of said drive shaft; and means to yieldably urge said drive shaft forwardly to maintain said drive abutments out of driving engagement; said drive shaft, upon actuation by said rotor, causing rotation of said element in said barrel and thereby relative rotation of the head and base portions of said clamp to selectively secure and release said clamp.

2. A speedrunner for actuating an axial, pin type clamp having a base portion and a relatively rotatable head portion with tool engaging formations on each portion, comprising: a barrel having an aft end containing a drive rotor and a fore end having an inner wall formed as a restraining socket to engage the base portion of said clamp; a driving element mounted for rotation in an intermediate portion of said barrel and restrained against axial movement; the fore end of said element being formed as a drive socket to surround and engage the head portion of the clamp; a drive shaft slidably and non-rotatably mounted in said element; the fore end of said shaft in forward position being aft of the fore end of said element; the aft end of said shaft in forward position being spaced forwardly from said rotor, and in aft position being engageable with said rotor to be driven by it; and yieldable means to urge said shaft forwardly out of driving engagement with said rotor; the fore end of said shaft being engageable by the head portion of said clamp entering into the drive socket of said element to force said shaft rearwardly against said yieldable means into driven engagement with said rotor.

3. A speedrunner as claimed in claim 2; the aft end of said drive shaft having an enlarged head; the rear face of said head bearing abutments; and the front face of said rotor bearing abutments engageable with the first abutments upon rearward movement of the drive shaft.

4. A speedrunner as claimed in claim 2; said driving element being formed as an elongate sleeve having a cylindrical outer wall for rotation in said barrel and having an axial passage therethrough of polygonal cross-section; the rear portion of said passage slidably receiving said drive shaft and the fore end slidably receiving the head portion of said clamp.

5. A speedrunner as claimed in claim 4; and, in addition thereto, bearing means in said barrel; an outwardly extending flange on the aft end of said element axially restrained between the fore and aft portions of said bearing means; and said drive shaft including an enlarged head at its aft end slidingly and rotatably mounted in the aft portion of said bearing means.

6. A speedrunner for actuating an axial, pin type clamp having a base portion and a relatively rotatable head portion with tool engaging formations on each portion, comprising: a barrel having an aft end containing a drive rotor and a fore end having an inner wall formed as a restraining socket to engage the base portion of said clamp; a driving element mounted for rotation in an intermediate portion of said barrel and restrained against axial movement; the fore end of said element being formed as a drive socket to surround and engage the head portion of the clamp; a drive coupler slidably connected to said element and rotatable therewith; said coupler being axially movable between a rearward position in which it is drivably engaged by the drive rotor and a forward position in which it is disengaged therefrom; and yieldable means to urge said coupler to said forward position; said coupler being movable rearwardly against the force of said yieldable means by entry of the head portion of said clamp into the fore end of said socket.

7. A speedrunner as claimed in claim 6; said drive rotor and said drive coupler bearing positive abutment means mutually engageable for positive driving of said coupler and said driving element.

8. A speedrunner as claimed in claim 6; said yieldable means comprising a coil spring axially located between said rotor and said coupler and being loaded in compression to urge said rotor and coupler apart axially.

9. A speedrunner as claimed in claim 6; including a bar magnet arranged substantially coaxially of the drive element and having one pole exposed in the drive socket to confront the head portion of the clamp.

10. A speedrunner for actuating an axial, pin type clamp having a base portion and a relatively rotatable head portion with tool engaging formations on each portion, comprising: a barrel having a fore end and an aft end; a drive rotor at said aft end; a restraining socket at said fore end to engage the base portion of said clamp to prevent rotation; a nutrunner journaled in said barrel; the fore part of said nutrunner including a drive socket to engage the head portion of said clamp to rotate it relative to the base portion; the aft part of said nutrunner including means engageable by said drive rotor in response to entry of the head portion of the clamp into the drive socket to cause rotation of said drive socket and the head portion of the clamp.

11. A speedrunner as claimed in claim 10; said means engageable by the drive rotor including means directly engageable by the head portion of the clamp on entry into the drive socket to cause axial movement of the means engageable by the drive rotor.

12. A speedrunner as claimed in claim 10; the drive socket being restrained against axial movement; and the means engageable by said drive rotor being axially movable into and out of driving engagement with said drive rotor.

13. A speedrunner as claimed in claim 12; said drive rotor and the means engageable thereby each being provided with positive abutments to produce a positive, non-slip drive.

14. A method of actuating an axial, pin type clamp having a base portion and a relatively rotatable head portion with tool engaging formations on each portion by means of an apparatus including a restraining socket, a drive socket, and a drive rotor drivingly engageable with and disengageable from said drive socket, comprising: engaging said restraining socket and said drive socket with said base portion and head portion, respectively, of the clamp; holding said restraining socket against rotation; bringing said drive rotor up to full operational speed to develop maximum momentum; and suddenly engaging said drive rotor with said drive socket to transfer its momentum thereto for initiating rotation of said head portion with the maximum power available.

15. A method of extracting from a workpiece an axial, pin type clamp having a base portion and a head portion having nut-like exterior surfaces threadedly connected thereto for rotation to expand and contract the pin portion thereof in an aperture in the workpiece, the threads of said portions binding at each extremity of relative travel, each portion having tool engaging formations thereon, by means of an apparatus including a restraining socket, a drive socket, having a complementary configuration to the restraining socket, and a controllable torque drive rotor to apply rotational torque to said drive socket, comprising:

engaging said restraining socket and said drive socket with said base portion and head portion, respectively, of the clamp; holding said restraining socket against rotation; operating said drive rotor to rotate said drive socket in a direction to contract the pin portion of the clamp until the threads of the head portion and base portion bind; maintaining the torque on said drive rotor to maintain the torque relation between the restraining socket and the drive socket and produce a very high frictional binding force between the sockets and the respective clamp portions; applying full operational drive rotor speed to apply axial tension to said barrel to pull the pin portion of the clamp free of the work piece; and relaxing the torque to release the clamp from said sockets.

16. The combination of an axial, pin type clamp and a speedrunner for applying it to and releasing it from a workpiece; said clamp having a base portion and a head portion threadedly connected thereto for rotation to expand and contract the pin portion thereof in an aperture in the workpiece, the threads of said portions binding at each extremity of relative travel, and each portion having tool engaging formations thereon; said speedrunner including a restraining socket, a drive socket, and a controllable torque drive rotor to apply rotational torque to said drive socket; said restraining socket being engageable with the base portion of the clamp to hold it against rotation; said drive socket being engageable with the head portion to rotate it in one direction to expand the pin portion and in the other direction to contract the pin portion; upon application of full operational drive motor speed said drive rotor being operable to maintain the torque relation between the restraining socket and the drive socket and thus produce a high frictional binding force between the sockets and the respective clamp portions upon completion of their relative movement; the speedrunner serving as a handle for withdrawal of the clamp from the workpiece so long as the torque and the binding forces are maintained; the clamp being readily releasable upon relaxation of the torque.

References Cited by the Examiner
UNITED STATES PATENTS

| | | | |
|---|---|---|---|
| 2,239,072 | 4/1941 | Adams | 81—55 |
| 2,525,117 | 10/1950 | Campbell | 81—55 |
| 2,760,393 | 8/1956 | Stough | 81—55 X |
| 2,961,903 | 11/1960 | Roggenburk | 173—93 |
| 3,139,675 | 7/1964 | Devine et al. | 29—240 |
| 3,156,309 | 11/1964 | Swenson | 173—93 |

JOHN F. CAMPBELL, *Primary Examiner.*

THOMAS H. EAGER, *Examiner.*